United States Patent
Ranjan et al.

(10) Patent No.: US 8,402,543 B1
(45) Date of Patent: Mar. 19, 2013

(54) MACHINE LEARNING BASED BOTNET DETECTION WITH DYNAMIC ADAPTATION

(75) Inventors: Supranamaya Ranjan, Albany, CA (US); Feilong Chen, North Bergen, NJ (US)

(73) Assignee: Narus, Inc., Sunnyvale, CA (US)

( * ) Notice: Subject to any disclaimer, the term of this patent is extended or adjusted under 35 U.S.C. 154(b) by 132 days.

(21) Appl. No.: 13/072,290

(22) Filed: Mar. 25, 2011

(51) Int. Cl.
*H04L 29/06* (2006.01)
(52) U.S. Cl. ............... 726/23; 726/3; 726/11; 709/223; 713/118
(58) Field of Classification Search .................. 726/1–3, 726/11–14, 22–25; 713/188; 709/223–225
See application file for complete search history.

(56) References Cited

U.S. PATENT DOCUMENTS

| | | | |
|---|---|---|---|
| 8,056,132 B1 * | 11/2011 | Chang et al. ................ | 726/23 |
| 8,161,548 B1 * | 4/2012 | Wan .............................. | 726/22 |
| 8,195,750 B1 * | 6/2012 | Bakhmutov .................. | 709/206 |
| 8,244,752 B2 * | 8/2012 | Buehrer et al. ............... | 707/769 |
| 2008/0307526 A1 * | 12/2008 | Chung et al. ................. | 726/23 |
| 2011/0153811 A1 * | 6/2011 | Jeong et al. .................. | 709/224 |
| 2011/0320816 A1 * | 12/2011 | Yao et al. ..................... | 713/171 |
| 2012/0096549 A1 * | 4/2012 | Amini et al. ................. | 726/23 |
| 2012/0159620 A1 * | 6/2012 | Seifert et al. ................ | 726/22 |

OTHER PUBLICATIONS

T. Gestel et al., "Benchmarking least square support vector machine classifiers", Machine Learning, pp. 5-32, 2004.*
J. Ye, et al., Svm versus least square svm. In Proceedings of the Eleventh International Conference on Artificial Intelligence and Statistics, pp. 640-647, 2007.
R. Perdisci, et al., Detecting malicious flux service networks through passive analysis of recursive DNS traces. In Annual Computer Society Security Applications Conference (ACSAC), Dec. 2009.
J. Ma, et al., Beyond blacklists: Learning to detect malicious websites from suspicious urls. In KDD '09: Proceedings of the ACM SIGKDD International Conference on Knowledge Discovery and Data Mining, pp. 1245-1254, New York, NY, USA, 2009.
G. Gu, et al., BotHunter: Detecting malware infection through ids-driven dialog correlation. In Proceedings of the 16th USENIX Security.Security Symposium (Security'07), Aug. 2007.
E. Cooke, et al., The zombie roundup: Understanding, detecting, and disrupting botnets. In SRUTI Proceedings of conference on Steps to Reducing Unwanted Traffic on the Internet, pp. 39-44, 2005.
G. Gu, et al., BotSnifer: Detecting botnet command and control channels in network traffic. In Proceedings of the 15th Annual Network and Distributed System Security Symposium (NDSS'08), Feb. 2008.
D. E. Rumelhart, et al., Learning internal representations by error propagation. pages 318-362, 1986.
J. Goebel, et al., Rishi: identify bot contaminated hosts by irc nickname evaluation. In HotBots'07: Proceedings of the First conference on First Workshop on Hot Topics in Understanding Botnets, pp. 8-8, Berkeley, CA, USA, 2007.

(Continued)

*Primary Examiner* — Kim Vu
*Assistant Examiner* — John B King
(74) *Attorney, Agent, or Firm* — Fernandez & Associates, LLP

(57) ABSTRACT

Embodiments of the invention address the problem of detecting bots in network traffic based on a classification model learned during a training phase using machine learning algorithms based on features extracted from network data associated with either known malicious or known non-malicious client and applying the learned classification model to features extracted in real-time from current network data. The features represent communication activities between the known malicious or known non-malicious client and a number of servers in the network.

27 Claims, 6 Drawing Sheets

OTHER PUBLICATIONS

Q. Wang, et al., Svm-based spam filter with active and online learning. In TREC '06: Proceedings of the 15th Text Retrieval Conference, Gaithersburg, Maryland, US 2006.

S. Yadav. et al., Detecting algorithmically generated malicious domain names. In Proceedings of of ACM Internet Measurement Conference, Melbourne, Australia Nov. 2010.

C. Kreibich, et al., On the spam campaign trail. In Proceedings of the 1st Usenix Workshop on Large-Scale Exploits and EmergentThreats, 2008.

T. Gestel, et al., Benchmarking least square support vector machine classifiers. Machine Learning, 54(1), pp. 5-32, 2004.

J. Suykens, et al., Least Squares Support Vector Machines. World Scientific Pub, Singapore, 2002.

S. Nagaraja, et al.. Botgrep: Finding p2p bots with structured graph analysis. In Proceedings of the 19th Usenix conference on Security, Usenix Security'10, pp. 7-7, Berkeley, CA, USA, 2010.

D. Tax, et al., Online svm learning: from classifcation to data description and back. In Neural Networks for Signal Processing 2003 IEEE 13th Workshop on (NNSP'03), pp. 499-508, 2003.

R. Perdisci. et al., Behavioral clustering of http-based malware and signature generation using malicious network traces. In Proc. of NSDI, Apr. 2010.

P. Porras, et al., An analysis of conficker's logic and rendezvous points. Technical report, SRI International, Menlo Park, California, Feb. 2009.

D. Sculley et al.,. Relaxed online svms for spam itering. In SIGIR '07: Proceedings of the 30th annual international ACM SIGIR conference on Research and development in information retrieval, pp. 415-422, New York, NY, USA, 2007.

J. R. Binkley, et al., An algorithm for anomaly-based botnet detection. In SRUTI'06: Proceedings of the 2nd conference on Steps to Reducing Unwanted Traffic on the Internet pp. 7-7, Berkeley, CA, USA, 2006.

L. Zhang, et al., an evaluation of statistical spam Filtering techniques. In ACM Transactions on Asian Language Information Processing, 2004.

J. Ma, et al., Identifying suspicious urls: an application of large-scale online learning. In ICML '09: Proceedings of the 26th Annual International Conference on Machine Learning, pp. 681-688, New York, NY, USA, 2009.

\* cited by examiner

MACHINE LEARNING BASED BOTNET DETECTION WITH DYNAMIC ADAPTATION

BACKGROUND OF THE INVENTION

1. Field of the Invention

The present invention relates to computers and computer networks. More particularly, the invention relates to detecting malicious activities in the computer network.

2. Background of the Related Art

The term "botnet" refers to a collection of malicious software agents (referred to as robots) that run autonomously and automatically. The term "botnet" can also be used to refer to a collection of compromised computers (referred to as bots) each infected with one or more of such malicious software agents. For example, the infection may be a result of installation via drive-by downloads exploiting web browser vulnerabilities, worms, Trojan horses, or backdoors, under a common command-and-control infrastructure. Typically, the owner (i.e., originator, operator, or controller) of a botnet uses the botnet to coordinate spam campaigns, launch denial-of-service attacks, or steal sensitive information. Several botnets have been found and removed from the Internet. The Dutch police found a 1.5 million node botnet and the Norwegian ISP (Internet service provider) Telenor disbanded a 10,000-node botnet. Large coordinated international efforts to shut down botnets have also been initiated. It has been estimated that up to one quarter of all personal computers connected to the internet may be part of a botnet.

A botnet's originator can control the bots remotely, usually through a means such as IRC (Internet Relay Chat), from a command-and-control (C&C) server. Though rare, more experienced botnet operators program their own commanding protocols from scratch. For example, these protocols may include a server program for C&C and a client program for operation that embeds itself on the victim's machine (i.e., bot). Both programs usually communicate with each other over a network using a unique encryption scheme for stealth and protection against detection or intrusion into the botnet network.

Generally, detection of C&C channels is difficult for many reasons, including: 1) the use of HTTP protocols to bypass firewalls, 2) encryption to obscure payloads, and 3) "domain fast-flux," i.e., constantly changing locations of command-and-control servers. Existing approaches that look for payload signatures can be easily defeated by encryption or obfuscation techniques. Techniques that identify periodic, beaconing traffic have difficulty in real traffic traces due to very high background noise levels and random timing perturbations introduced by new botnets. There are also practical limitations to collecting detailed flow data at high speed routers which can introduce unacceptable overhead on the network.

SUMMARY

In general, in one aspect, the invention relates to a method for botnet detection in a network. The method includes extracting, by a processor of a computer system and from first network traffic data exchanged between a malicious client and a plurality of servers in the network, a malicious data instance comprising a first plurality of features, corresponding to the plurality of servers, each representing a measure of communication activity between the malicious client and a first corresponding server in the first network traffic data, extracting, by the processor and from second network traffic data exchanged between a non-malicious client and the plurality of servers, a non-malicious data instance comprising a second plurality of features, corresponding to the plurality of servers, each representing the measure of communication activity between the non-malicious client and a second corresponding server in the second network traffic data, including the malicious data instance and the non-malicious data instance in a training data set comprising a plurality of malicious data instances and non-malicious data instances, wherein each data instance of the plurality of malicious data instances and non-malicious data instances is associated with one of a plurality of clients comprising the malicious client and the non-malicious client, generating, by the processor and using a pre-determined machine learning algorithm, a classification model based on the training data set, wherein the classification model is adapted to, when applied to each malicious data instance, generate a malicious label, wherein the classification model is further adapted to, when applied to each non-malicious data instance, generate a non-malicious label, extracting, by the processor and from third network traffic data exchanged between a unclassified client and the plurality of servers, a unclassified data instance comprising a third plurality of features, corresponding to the plurality of servers, each representing a measure of communication activity between the unclassified client and a third corresponding server in the third network traffic data, generating, by the processor, a classification label of the unclassified data instance by applying the classification model to the unclassified data instance, wherein the classification label comprises the malicious label, and identifying, in response to the classification label comprising the malicious label, the unclassified client as associated with a botnet.

In general, in one aspect, the invention relates to a system for botnet detection in a network. The system includes a hardware processor, a feature extractor executing on the hardware processor and configured to (i) extract, from first network traffic data exchanged between a malicious client and a plurality of servers in the network, a malicious data instance comprising a first plurality of features, corresponding to the plurality of servers, each representing a measure of communication activity between the malicious client and a first corresponding server in the first network traffic data, (ii) extract, from second network traffic data exchanged between a non-malicious client and the plurality of servers, a non-malicious data instance comprising a second plurality of features, corresponding to the plurality of servers, each representing the measure of communication activity between the non-malicious client and a second corresponding server in the second network traffic data, (iii) include the malicious data instance and the non-malicious data instance in a training data set comprising a plurality of malicious data instances and non-malicious data instances, wherein each data instance of the plurality of malicious data instances and non-malicious data instances is associated with one of a plurality of clients comprising the malicious client and the non-malicious client, and (iv) extract, from third network traffic data exchanged between a unclassified client and the plurality of servers, a unclassified data instance comprising a third plurality of features, corresponding to the plurality of servers, each representing the measure of communication activity between the unclassified client and a third corresponding server in the third network traffic data, a model generator operatively coupled to the feature extractor, executing on the hardware processor, and configured to generate, using a pre-determined machine learning algorithm, a classification model based on the training data set, wherein the classification model is adapted to, when applied to each malicious data instance, generate a malicious label, wherein the classification model is further adapted to, when applied to each non-malicious data instance, generate a non-malicious label, an online classifier operatively coupled to the model generator, executing on the hardware processor, and configured to (i) generate a classification label of the unclassified data instance by applying the classification model to the unclassified data instance, wherein the classification label comprises the malicious label and (ii) identify, in response to the classification label comprising the malicious label, the unclassified client as associated with a botnet, and a repository coupled to the online classifier and configured to store the plurality of malicious data instances and non-malicious data instances, the unclassified data instance, and the classification model.

In general, in one aspect, the invention relates to a non-transitory computer readable medium storing instructions for identifying a botnet in a network. The instructions when executed by a processor of a computer includes functionality for extracting, from first network traffic data exchanged between a malicious client and a plurality of servers in the network, a malicious data instance comprising a first plurality of features, corresponding to the plurality of servers, each representing a measure of communication activity between the malicious client and a first corresponding server in the first network traffic data, extracting, from second network traffic data exchanged between a non-malicious client and the plurality of servers, a non-malicious data instance comprising a second plurality of features, corresponding to the plurality of servers, each representing the measure of communication activity between the non-malicious client and a second corresponding server in the second network traffic data, including the malicious data instance and the non-malicious data instance in a training data set comprising a plurality of malicious data instances and non-malicious data instances, wherein each data instance of the plurality of malicious data instances and non-malicious data instances is associated with one of a plurality of clients comprising the malicious client and the non-malicious client, generating, using a pre-determined machine learning algorithm, a classification model based on the training data set, wherein the classification model is adapted to, when applied to each malicious data instance, generate a malicious label, wherein the classification model is further adapted to, when applied to each non-malicious data instance, generate a non-malicious label, extracting, from third network traffic data exchanged between a unclassified client and the plurality of servers, a unclassified data instance comprising a third plurality of features, corresponding to the plurality of servers, each representing a measure of communication activity between the unclassified client and a third corresponding server in the third network traffic data, generating a classification label of the unclassified data instance by applying the classification model to the unclassified data instance, wherein the classification label comprises the malicious label, and identifying, in response to the classification label comprising the malicious label, the unclassified client as associated with a botnet.

Other aspects and advantages of the invention will be apparent from the following description and the appended claims.

DETAILED DESCRIPTION

Figure 1:
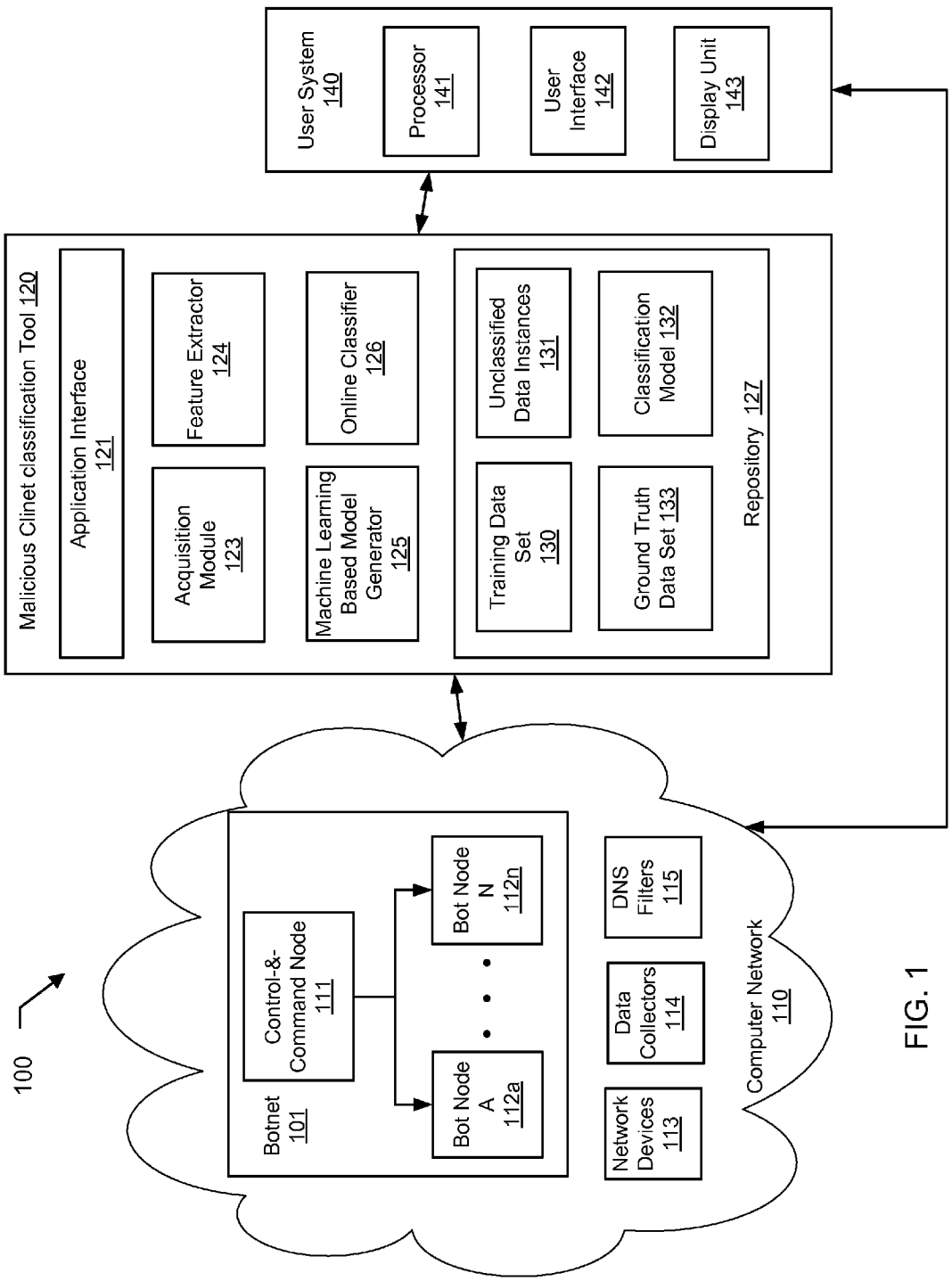
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention address the problem of detecting bots in network traffic based on a classification model learned during a training phase using machine learning algorithms based on features extracted from network data associated with either known malicious or known non-malicious client and applying the learned classification model to features extracted in real-time from current network data. In one or more embodiments, the features may be derived by using only the layer-3 communication activity information. In particular, the layer-3 communication activity information presents a worst-case scenario for botnet detection, i.e., the least amount of information available to a classifier or detector. While this makes the botnet detection problem significantly more difficult, such approach delivers higher performance in botnet detection even in the environment of encrypted traffic flows.

Generally, a botnet relies on bots communicating with C&C servers to obtain instructions whereas legitimate clients are unlikely to communicate with the same servers in a statistically significant manner. In one or more embodiments of the invention, a client machine is detected as a bot by examining the set of server IP addresses it had visited (i.e., communicated with) in the past. However, two challenges remain to be addressed. First, the set of server IP addresses visited by client machines often evolves dynamically. Second, the set of client machines used for training and their class labels (i.e., classification labels: malicious or non-malicious) may also change over time. In one or more embodiments, an incremental least square support vector machine (LS-SVM) algorithm adaptive to both evolving features and training instances is used as the supervised machine learning algorithm to overcome these two challenges. Based on the high performance of this incremental LS-SVM algorithm, embodiments of the invention re-learn new machine learning models over time, utilizing continually updated lists of known bots for training. In this regards, the classifier is retrained and the learned model is to keep pace with the changing botnet behavior.

In this manner, botnet detection is performed as a binary classification task where each client IP address seen in the network is labeled as malicious or non-malicious by the classifier based on the classification model. In one or more embodiments, layer-3 communication activity information is collected during the training phase for extracting features to be used in the supervised machine learning process to generate the classification model. Statistics of the layer-3 communication activity information is compiled over a period of time by counting the number of traffic data units (e.g., flows, packets, bytes, etc.) exchanged between a set of servers and a set of clients that are known malicious clients and known non-malicious clients. Features based on such statistical counts represent a measure of communication activities associated with known malicious clients and known non-malicious clients and are included in a training data set for generating the classification model. In one or more embodiments, the known malicious clients and known non-malicious clients are identified using ground truth labels for a set of client IP addresses obtained from IP blacklists (e.g., lists maintained by Spamhaus, SORBS, etc.) as well as from an Intrusion Detection System (IDS).

Similarly, the features for new and not yet labeled network traffic are extracted during an online phase (i.e., real-time detection phase) to which the trained classification model is applied to determine whether communication activities associated with these network traffic reflect botnet communication or legitimate activity. Accordingly, a client associated with such network traffic may be dynamically labeled as malicious (i.e., associated with a botnet as a bot) or legitimate/non-malicious (i.e., not associated with a botnet) as it is observed for the first time in real-time network traffic data or as additional traffic data involving it is observed. Throughout this disclosure, bots in a botnet are referred to as malicious clients while legitimate clients are referred to as non-malicious clients. Further, detecting a client as a bot or legitimate client is referred to as classifying or labeling the client as malicious or non-malicious, respectively.

FIG. 1 shows a diagram of a system (100) for machine learning based botnet detection using extracted features in accordance with one or more embodiments. The system (100) includes a malicious client classification tool (120), a user system (140), and a computer network (110). The malicious client classification tool (120) includes data repository (127), one or more application interfaces (121), acquisition module (123), feature extractor (124), machine learning based model generator (125), and online classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, a portion of the computer network (110) may be infected by malicious programs to form a botnet (101) including a control-and-command (C&C) node (111) and one or more bot nodes (e.g., bot node A (112a), bot node N (112n), etc.). Generally, the botnet (101) may cause additional malicious activities to affect and/or infect other network devices (e.g., network devices (113)) within the computer network (110). In one or more embodiments, certain device(s) (e.g., data collectors (114)) within the computer network (110) may be configured to collect network data (not shown) for providing to the malicious client classification tool (120). In one or more embodiments, certain device(s) (e.g., DNS filters (115)) within the computer network (110) may be configured to sanction (e.g., passing or blocking) network traffic (e.g., DNS queries, not shown) based on information from the malicious client classification tool (120). The C&C node (111), bot node A (112a), bot node N (112n), and network devices (113) are generally referred to as nodes of the computer network (110). Each of these components is described below. One of ordinary skill in the art will appreciate that embodiments are not limited to the configuration shown in FIG. 1.

In one or more embodiments of the invention, the malicious client classification tool (120) is configured to interact with the computer network (110) using one or more of the application interface(s) (121). The application interface (121) may be configured to receive data (e.g., network traffic data, not shown) from the computer network (110) and/or store received data to the data repository (127). Such network data captured over a time period (e.g., an hour, a day, a week, etc.) is referred to as trace or network trace. Network trace contains network traffic data related to communications between nodes in the computer network (110). Further, the network trace may be associated with a client with a known label (e.g., malicious, non-malicious, etc.) and is referred to as labeled network data. Alternatively, the network trace may be associated with a client without any known label (e.g., malicious, non-malicious, etc.) and is referred to as unlabeled network data. For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the malicious client classification tool (120).

In one or more embodiments, the application interface (121) may be configured to provide data (e.g., alert or other results) and/or instruction (e.g., to initiate a network security operation) from the malicious client classification tool (120) to the computer network (110). For example, an alert identifying detected malicious client names or an instruction to block malicious traffic may be provided via the application interface (121) to the DNS filters (115). For example, the DNS filters (115) may include a DNS server configured to block certain domain names by specifying the blocked domain names in the DNS server policy, i.e., domain blacklisting. Further, the DNS filters (115) may include a network router that intercept and selectively block DNS traffic (e.g., DNS queries and/or replies) passing over the computer network (110) or a portion thereof. In particular, the identified malicious client name may be used to facilitate the identification of a source node in the computer network (110) that sends one or more DNS queries of such malicious domain names. For example, once a malicious domain name is determined, the DNS flows/packets may be reviewed to determine which client in the network initiated the relevant DNS query: (1) the querier may be a DNS resolver acting on behalf of the actual client (i.e., source node) or (2) it may be the actual client (i.e., source node) which sent the query directly to the DNS server. In case (1) above, the logs maintained at the particular DNS resolver may be reviewed to find out the IP address of the client (i.e., source node) which actually contacted this resolver and be identified as a bot.

Accordingly, one or more network router(s) located logically between the DNS server and the source node (e.g., a bot) sending the malicious DNS queries may be configured to act as the DNS filters (115) blocking such bot-generated DNS queries. In one or more embodiments, the DNS filters (115) may be configured in the computer network (110) by a network communication service provider (e.g., ISP), a network security service provider, or other business or government entities. In one or more embodiments, the malicious client classification tool (120) is configured to support various data formats provided by the computer network (110).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the malicious client classification tool (120). The user may include, but is not limited to, an individual, a group, an organization, or some other entity having authority and/or responsibility to access the malicious client classification tool (120). Specifically, the context of the term "user" here is distinct from that of a user of the computer network (110). The user system (140) may be, or may contain a form of, an internet-based communication device that is capable of communicating with the application interface (121) of the malicious client classification tool (120). Alternatively, the malicious client classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the malicious client classification tool (120) (e.g., report, alert, etc.).

As shown, communication links are provided between the malicious client classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the malicious client classification tool (120), the user system (140), and the communication links may be part of the computer network (110).

In one or more embodiments, a central processing unit (CPU, not shown) of the malicious client classification tool (120) is configured to execute instructions to operate the components of the malicious client classification tool (120) (e.g., data repository (127), the application interface (121), the acquisition module (123), and the online classifier (126)). In one or more embodiments, the memory (not shown) of the malicious client classification tool (120) is configured to store software instructions for analyzing the network trace to extract features, generating classification models, and classifying client nodes and/or associated communication activities in the network trace as malicious or legitimate. The memory may be one of a variety of memory devices, including but not limited to random access memory (RAM), read-only memory (ROM), cache memory, and flash memory. The memory may be further configured to serve as back-up storage for information stored in the data repository (127).

In one or more embodiments, the malicious client classification tool (120) is configured to obtain and store data in the data repository (127). In one or more embodiments, the data repository (127) is a persistent storage device (or set of devices) and is configured to receive data from the computer network (110) using the application interface (121). The data repository (127) is also configured to deliver working data to, and receive working data from, the acquisition module (123), feature extractor (124), machine learning based model generator (125), and online classifier (126). The data repository (127) may be a data store (e.g., a database, a file system, one or more data structures configured in a memory, some other medium for storing data, or any suitable combination thereof), which may include information (e.g., training data set (130), unclassified data instances (131), ground truth data set (133), classification model (132), etc.) related to the malicious client classification. The data repository (127) may be a device internal to the malicious client classification tool (120). Alternatively, the data repository (127) may be an external storage device operatively connected to the malicious client classification tool (120).

In one or more embodiments, the malicious client classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the malicious client classification tool (120) is configured to support various data formats provided by the user system (140).

In one or more embodiments, the malicious client classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (e.g., defined by a source IP address, destination IP address, etc.). For example, such network trace, or information extracted therefrom, may then be stored in the repository (127) as training data set (130) and/or un classified data instances (131).

In one or more embodiments, the acquisition module (123) is further configured to obtain external blacklists that provide information regarding what client IP addresses are known to be malicious and/or whitelists that provide information regarding what client IP addresses are known to be non-malicious. For example, such blacklists and whitelists may include publically available lists or confidential lists of known bots and known non-malicious clients, respectively, and may be stored in the repository (127) as part of the ground truth data set (133). Accordingly, the acquisition module (123) may monitor and acquire network traffic data associated with a number of classified clients (i.e., malicious clients and non-malicious clients) identified based on such blacklists and whitelists in the ground truth data set (133). In addition, the acquisition module (123) may monitor and acquire network traffic data associated with a not yet classified client (i.e., unclassified client) to be analyzed for classifying the unclassified client.

In one or more embodiments of the invention, the malicious client classification tool (120) includes the feature extractor (124) that is configured to extract, from network traffic data exchanged between a malicious client and a number of servers in the network, a malicious data instance including a set of features, corresponding to the number of servers, each representing a measure of communication activity between the malicious client and a corresponding server in this network traffic data. In one or more embodiments, the measure of communication activity may be a number of flows exchanged during a pre-determined length of time (e.g., one hour, six hour, one day, multiple days, etc.), a number of packets exchanged during the pre-determined length of time, or a number of bytes exchanged during the pre-determined length of time.

In a similar manner, the feature extractor (124) is configured to extract, from network traffic data exchanged between a non-malicious client and the number of servers, a non-malicious data instance including a set of features, corresponding to the number of servers, each representing the measure of communication activity between the non-malicious client and a corresponding server in the network traffic data.

In a similar manner, the feature extractor (124) is configured to extract, extract, from network traffic data exchanged between a unclassified client and the number of servers, a unclassified data instance (also referred to as unlabeled data instances) including a number of features, corresponding to the number of servers, each representing the measure of communication activity between the unclassified client and a corresponding server in the network traffic data. In one or more embodiments, such unclassified data instance is stored in the repository among other unclassified data instances as the unclassified data instances (131).

Figure 2:
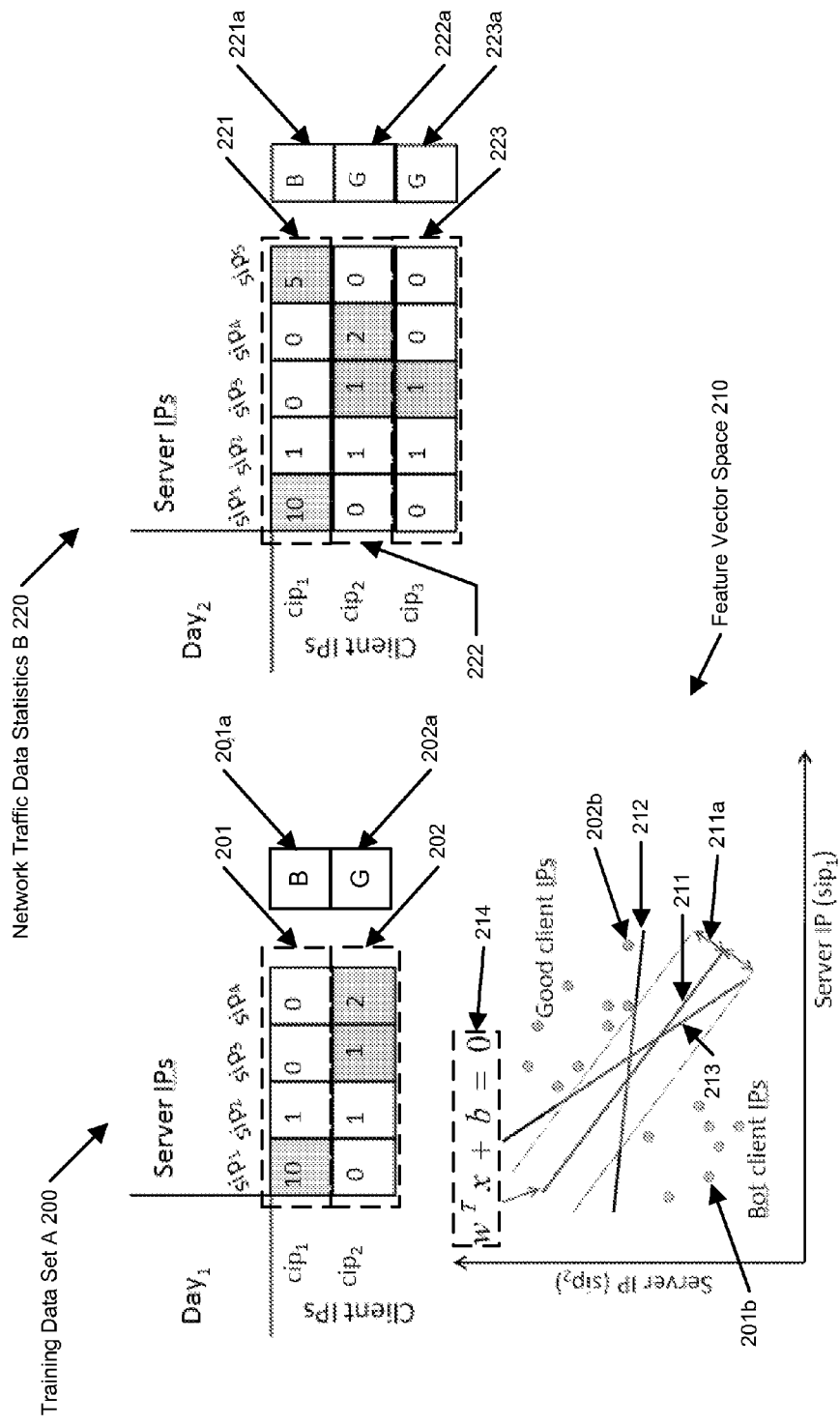
FIG. 2 shows an example according to aspects of the invention.

An example of malicious data instance and non-malicious data instance are shown in the training data set A (200) of FIG. 2. As shown, the training data set A (200) include the malicious data instance (201), with classification label (201a) indicating that it is malicious or "bad", in the form of a feature vector (10, 1, 0, 0) having four features each representing the measure of communication activity between the malicious client (denoted by the IP address $cip_1$) and a corresponding server. For example, during a six hour time period, the malicious client $cip_1$ may have exchanged 10 flows with a server denoted by the IP address $sip_1$, 1 flow with a server denoted by the IP address $sip_2$, 0 flow with a server denoted by the IP address $sip_3$, and 0 flow with a server denoted by the IP address $sip_4$. As describe below, the malicious data instance (201) is labeled as malicious based on its association with the malicious client $cip_1$, which does not imply that all communication activities represented in the malicious data instance (201) are malicious. In fact, some of the flows exchanged between the malicious client $cip_1$ and one or more of the servers $sip_1$, $sip_2$, $sip_3$, and $sip_4$ may be legitimate.

In addition, the training data set A (200) include the non-malicious data instance (202), with classification label (202a) indicating that it is non-malicious or "good", in the form of a feature vector (0, 1, 1, 2) having four features each representing the measure of communication activity between the non-malicious client (denoted by the IP address $cip_2$) and a corresponding server. For example, during a six hour time period, the non-malicious client $cip_2$ may have exchanged 0 flow with the server $sip_1$, 1 flow with a server $sip_2$, 1 flow with the server $sip_3$, and 2 flows with the server $sip_4$. Although not specifically shown, an example unclassified data instance may have the same format as the malicious data instance (201) and the non-malicious data instance (202).

Returning to the discussion of FIG. 1, the feature extractor (124) is further configured to include the malicious data instance (201) and the non-malicious data instance (202), both referred to as labeled data instances (or classified data instances), in the training data set (134) that includes a collection of malicious data instances and non-malicious data instances. In particular, each data instance in the collection of malicious data instances and non-malicious data instances is associated with one of a number of malicious clients and non-malicious clients including the malicious client $cip_1$ and the non-malicious client $cip_2$. Specifically, data instances associated with one or more IP address in the aforementioned IP blacklist are labeled as malicious in the training data set (134) while data instances associated with one or more IP address in the aforementioned IP whitelist are labeled as non-malicious in the training data set (134). Although only two example data instances are shown in FIG. 2 where each has four features in the feature vector, any number of data instances may be included in the training data set (134) and any number of features may be included in the feature vector for each data instance in the training data set (134).

In one or more embodiments of the invention, the malicious client classification tool (120) includes the machine learning based model generator (125) that is configured to generate, using a pre-determined machine learning algorithm, a classification model (132) based on the training data set (134). In particular, the classification model (132) is adapted to, when applied to each malicious data instance in the training data set (134), generate a malicious label, and when applied to each non-malicious data instance in the training data set (134), generate a non-malicious label. In one or more embodiments, the pre-determined machine learning algorithm includes a support vector machine (SVM) algorithm described in reference to FIG. 3 below. In one or more embodiments, the classification model includes a decision surface of the SVM.

In one or more embodiments, the malicious client classification tool (120) includes the online classifier (126) that is configured to generate a classification label of a unclassified data instance (e.g., one of the unclassified data instaces (131)), extracted from the unlabeled network data (131), by applying the classification model (132) to the unclassified data instance. For example, the classification label may be the malicious label or the non-malicious label. Accordingly, the unclassified client associated with the unclassified data instance may be classified as being associated with a botnet if the unclassified data instance is labeled as malicious.

Figure 3:
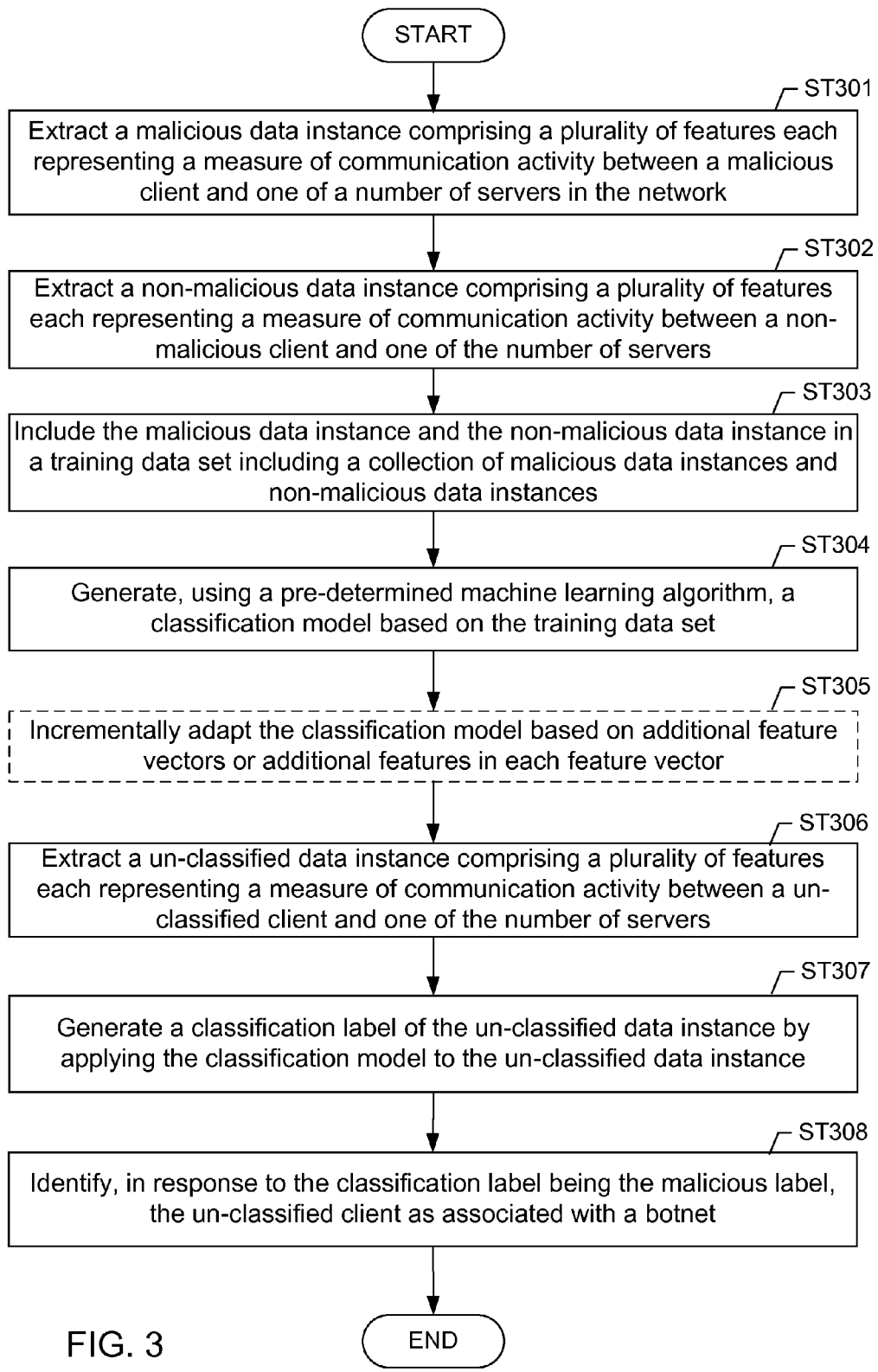
FIG. 3 shows a method flow chart according to aspects of the invention.

More details of extracting features, generating and incrementally adapting classification models based on the SVM algorithm, labeling unclassified data instances, and classifying unclassified clients in the network data are described in reference to FIGS. 2A-3 below.

The malicious client classification tool (120) may include one or more system computers, which may be implemented as a server or any conventional computing system However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, mini-computers, mainframe computers, and the like.

While specific components are depicted and/or described for use in the units and/or modules of the malicious client classification tool (120), it will be appreciated that a variety of components with various functions may be used to provide the formatting, processing, utility and coordination functions necessary to modify various working data used by the malicious client classification tool (120). The components may have combined functionalities and may be implemented as software, hardware, firmware, or combinations thereof.

In one or more embodiments of the invention, a method relying on the following hypothesis is used to detect bots.

Specifically, the hypothesis postulates that the set of servers that bots (i.e., malicious clients) communicate with are statistically different from the set of servers that legitimate clients (i.e., non-malicious clients) communicate with. The rationale behind this hypothesis is that botnet operators need to maintain communication with their bots in order to issue commands to them for the next attack to launch or to ensure that they have proper control over their bots by having the bots contact them frequently via periodic communication referred to as "heart-beat" requests.

However, this hypothesis can be complicated by the fact that the bot machines also communicate with legitimate servers either because the humans behind the machine are also using it or for legitimate purposes. For instance, bots may open an HTTP GET request to one of hundreds legitimate servers to obtain the current time of day. A method adapted to address such complication is described in detail below. The method may be practice using the system (100), described in reference to FIG. 1 above, to distinguish bots from legitimate clients based on which unique set of machines they communicate with.

In one or more embodiments, a flow parser (e.g., acquisition module (123) in conjunction with data collectors (114) in FIG. 1) reconstructs (e.g., eliminates redundant packets, collates packets into a correct sequence, etc.) all the packets that correspond to the same traffic flow, where a flow is defined as the unique 6-tuple of client and server IP addresses, client and server ports, timestamp, and layer-3 protocol (e.g., TCP, UDP, etc.). In one or more embodiments, the flows are captured and parsed throughout a pre-configured time interval recurring on a periodic basis (e.g., every minute, hourly, daily, etc.) or triggered in response to an event (e.g., observation or elimination of botnet or spam activity).

Within each pre-configured time interval, when a incoming flow with a pair of client and server IP addresses is parsed, aggregated (e.g., over a pre-configured time interval) communication activity statistics for the pair of IP addresses communicating with each other is updated (e.g., a count being incremented) based on the parsed flow. For example, the communication activity statistics may include aggregated counts of how many flows were exchanged between the IP-pair within the pre-configured time interval. In particular, a portion of such flows are referred to as labeled network data if their client IP addresses are already labeled (e.g., based on an IP blacklist or an IP whitelist), in which case their communication activity statistics is aggregated into labeled data instances (e.g., stored in the training data set (130) in FIG. 1). Further, another portion of such flows are referred to as unlabeled network data if their client IP addresses are not yet labeled, in which case their communication activity statistics is aggregated into unclassified data instances (e.g., the unclassified data instances (131) in FIG. 1).

For example, this pre-configured time interval may be one of a series of recurring training time intervals. For example, each recurring training time interval may be a six hour interval that occurs at 4:00 am each morning on a daily basis. At the end of each training time interval, the following information related to labeled network data is included in a training data set (e.g., training data set (134) in FIG. 1) and passed on to an online learning module (e.g., machine learning based model generator (125) in FIG. 1): timestamp for the end of the training time-interval, client IP address that is already labeled (e.g., based on an IP blacklist or an IP whitelise), server IP address, and number of flows exchanged during the training time-interval between the IP-pair with the already labeled client IP address. Accordingly, the online learning module generates a classification model (e.g., classification model (132) in FIG. 1) that is used by a classifier (e.g., online classifier (126) in FIG. 1) to classify each incoming flow with a not-yet labeled client IP address.

In another example, this pre-configured time interval may be one of a series of recurring detection time intervals. Although not necessary, the length of the detection time interval may be the same as the length of the training time interval. For example, each recurring detection time interval may be a six hour interval that occurs throughout the day one after another in a back to back manner or with certain overlap/separation among adjacent intervals. At the end of each training time-interval, the following information related to unlabeled network data is passed on to the classifier (e.g., online classifier (126) in FIG. 1): timestamp for the end of the detection time interval, client IP address that is not yet labeled, server IP address, and number of flows exchanged between the IP-pair with the not yet labeled client IP address. Accordingly, the classifier (e.g., online classifier (126) in FIG. 1) generates a classification label (e.g., malicious or non-malicious) for the unlabeled client IP address.

In one or more embodiments, such newly labeled client IP address may be added to the blacklist or whitelist in the ground truth data set (133). Because users may disinfect their infected devices thereby removing bots, a timestamp is assigned to each entry in the blacklist and/or whitelist while an entry may be removed after a pre-configured length of time from when it is added to the lists.

Generally, the most current one of the recurring time intervals is referred to as the current time interval. In one or more embodiments, the recurring training time intervals and the recurring detection time intervals may coincide with each other and commonly referred to as the recurring time intervals. In such embodiments, the labeled network data captured in the time interval immediately prior to the current time interval is analyzed to generate a classification model for classifying the unlabeled network data obtained in the current time interval.

Accordingly, as the current time interval expires into a prior time interval in the past, the labeled network data captured during the expiring current time interval becomes a new version of the labeled network data and is analyzed to generate a new version of classification model for classifying the unlabeled network data obtained in the next current time interval.

FIG. 2 depicts a method flowchart of methods in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 301, captured and reconstructed network flows are inspected to identify network traffic data exchanged between a malicious client and a number of servers in the network. In one or more embodiments of the invention, the malicious client is identified by comparing the client IP address in the network flows to a pre-determined IP blacklist. Accordingly, a data instance is extracted from flows associated with this malicious client. Such data instance is referred to as a malicious data instance to reflect its association with the malicious client. In one or more embodiments, the malicious data instance is in a format of a vector referred to as a feature vector that has a number of elements referred to as features. Each feature in the feature vector corresponds to a server and represents a measure of communication activity between the malicious client and the server in these network flows. In one or more embodiments, the communication activity is measured based on a number of flows, packets, bytes, or other data units exchanged during a training interval. An example of the malicious data instance is described in reference to FIG. 2 above.

In Step 301, captured and reconstructed network flows are inspected to identify network traffic data exchanged between a non-malicious client and a number of servers in the network. In one or more embodiments of the invention, the non-malicious client is identified by comparing the client IP address in the network flows to a pre-determined IP whitelist. Accordingly, a data instance is extracted from flows associated with this non-malicious client. Such data instance is referred to as a non-malicious data instance to reflect its association with the non-malicious client. In one or more embodiments, the non-malicious data instance is in the same feature vector format as the malicious data instance. Each feature in the feature vector corresponds to a server and represents a measure of communication activity between the non-malicious client and the server in these network flows. In one or more embodiments, the communication activity is measured based on a number of flows, packets, bytes, or other data units exchanged during the aforementioned training interval.

In Step 303, the malicious data instance and the non-malicious data instance is included in a training data set, which typically includes a collection of labeled data instances (i.e., malicious data instances and non-malicious data instances) extracted during the same training period and associated with a number of classified clients including the malicious client and the non-malicious client. In some cases, some data instances in the training data set may have different number of feature elements than other data instances, reflecting different number of servers each classified client has exchanged communication with during the training period. As a result, the cardinality of feature vectors in the training data set may vary. In one or more embodiments, all feature vectors may be mapped to a consistent vector format encompassing each server, in a server collection, ever communicated with any of the number of classified clients during the training period. Accordingly, the cardinality of the consistent vector format equals how many servers there are in the server collection.

Mathematically, the training data set for an $t^{th}$ training time interval (or the training time interval ending at time t) may be represented as $D^t=\{(x^t_i, y^t_i)\}, i=1 \ldots N_t$, where $x^t_i$ is a feature vector labeled by $y^t_i$, which may be a malicious label or a non-malicious label, referred to as a class label (or classification label) and $N_t$ represents how many feature vectors or labeled data instances exist in the $t^{th}$ training data set. Typically, $N_t$ equals how many classified clients there are in the training data set since each classified clients is associated with a labeled data instance. Generally, all feature vectors $x^t_i$ in the training data set $D^t$ may be represented in a matrix form referred to as $x^t$. The superscripts in these mathematical expressions may be omitted depending on the context, for example when only one training data set is referred to in the context.

In Step 304, using a pre-determined machine learning algorithm, a classification model is generated based on the training data set. In particular, when the classification model is applied to each malicious data instance by a classifier, the classifier generates a malicious label. When the classification model is applied to each non-malicious data instance by the classifier, the classifier generates a non-malicious label. In one or more embodiments, the pre-determined machine learning algorithm includes a support vector machine (SVM) algorithm and the classification model includes a decision surface of the SVM.

In one or more embodiments, the decision surface includes a maximum margin hyperplane in a multi-dimensional space with a number of axes each corresponding to a server in the aforementioned server collection and having coordinates representing the measure of communication activity between the server and any of the classified clients. In particular, this multi-dimensional space is a vector space (referred to as a feature space) based on the aforementioned consistent vector format. Accordingly, the cardinality of this multi-dimensional space equals how many servers there are in the server collection.

In one or more embodiments, the classification model is generated by the following steps:

(i) representing each labeled data instance in the training data set by a node in the multi-dimensional space (referred to as feature vector space);

(ii) formulating a constrained optimization criterion of the SVM algorithm based on the training data set. In particular, variables in the constrained optimization criterion includes a normal vector w of the maximum margin hyperplane and an intercept b of the maximum margin hyperplane;

(iii) converting the constrained optimization criterion to a unconstrained formulation using a pre-determined mathematical procedure; and (iv) determining the maximum margin hyperplane based on a mathematical solution of the unconstrained formulation for solving w and b, where the maximum margin hyperplane segregates a set of nodes corresponding to the malicious data instances and another set of nodes corresponding to the non-malicious instances.

An example feature vector space (210) is illustrated in FIG. 2. As shown in FIG. 2, the example feature vector space (210) corresponds to the training data set A (200). Based on the discussion above, the feature vector space (210) has a cardinality of four with four axes corresponding to the four servers $sip_1$ through $sip_4$ contributing to the training data set A (200). FIG. 2 depicts a cross-section of this four dimensional feature vector space projected to a two dimensional plane for clarity of illustration. As shown, the feature vector space (210) contains nodes representing many labeled data instances including the two labeled data instances $cip_1$ and $cip_2$ contained in the training data set A (200). As shown, node (201b) and node (202b) correspond to the labeled data instance (201) and labeled data instance (202), respectively. Further as shown in FIG. 2, four-dimensional hyperplanes are projected as line segments (211), (212), and (213) each segregating nodes (e.g., node (201b)) representing malicious data instances and other nodes (e.g., node (202b)) representing non-malicious data instances. The four-dimensional hyperplane represented by the line segment (211) is referred to as the maximum margin hyperplane because it maintains a maximum margin (211a), compared to other hyperplanes, from any node representing any of the labeled data instances. As shown, this maximum margin hyperplane has a normal vector represented by the equation (214) formulated as $w^T x+b=0$. The elements of the normal vector corresponds to axes of the feature vector space and is proportional to relative contributions (i.e., weights), from corresponding communication activities represented by the axes, to the maximum margin hyperplane in segregating nodes representing malicious data instances and other nodes representing non-malicious data instances.

In one or more embodiments, the SVM algorithm is configured to learn a linear decision surface, either in the original feature space or in a projected high-dimensional feature space. In one or more embodiments, a variation of a SVM classifier known as least-square support vector machine (LS-SVM) is used. Unlike regular SVM, which minimizes a hinge loss function with linear inequality constraints, LS-SVM optimizes the following least-square criterion subject to (denoted as s.t. in equation (1)) an equality constraint to maximize the margin of the decision surface resulting in the maximum margin hyerplane. The least-square criterion and the equality constraint is shown as:

$$\frac{1}{2}w^T w + \gamma \frac{1}{2}\sum_{i=1}^{N} e_i^2 \quad (1)$$

$$s.t. \quad yi[w^T x_i + b] = 1 - e_i, \forall i \in \{1, \ldots, N\}$$

where w and b are the normal vector and intercept of the maximum margin hyerplane, T is the mathematical transpose operator, $\gamma$ is a user-specified parameter, $x_i$ is a feature vector of a $i^{th}$ labeled data instance with the classification label $y_i$, $e_i$ is a margin between the node representing the $i^{th}$ labeled data instance and the closet maximum margin hyerplane, N is the number of labeled data instances in the training data set. An appealing feature of the optimization problem for LS-SVM is that it has a closed form solution, compared to the optimization problem for regular SVM, which requires numerical methods to solve a quadratic programming problem.

In one or more embodiments, the constraint optimization problem given in equation (1) can be mathematically converted into the following Lagrangian formulation:

$$L(w, b, e, \alpha) = \frac{1}{2}w^T w + \gamma \frac{1}{2}\sum_{i=1}^{N} e_i^2 - \sum_{i=1}^{N} \alpha_i \{yi[w^T x_i + b] - 1 + e_i\}, \quad (2)$$

where $\alpha_i$ is the set of Lagrange multipliers. Once the equations above are solved to obtain the classification model parameters w and b, the maximum margin hyerplane is determined and used as the classification model.

In an optional Step 305, the classification model generated from the training data set $D^t$ may be incrementally adapted based on additional feature vectors (referred to as dynamic data adaption due to $N_{t+1} > N_t$) in a new training data set $D^{t+1}$ or additional features (referred to as dynamic feature adaption due to $x^{t+1}_i$ having higher cardinality than $x^t_i$) in each feature vector in the new training data set $D^{t+1}$. More details of dynamic feature and/or data adaptation are described in reference to FIG. 2 and equations (3) through (x) below.

In Step 306, extracting, captured and reconstructed network flows are inspected to identify network traffic data exchanged between a unclassified client and a number of servers in the network. In one or more embodiments of the invention, the unclassified client is identified by comparing the client IP address in the network flows to a pre-determined IP blacklist and whitelist without any match. Accordingly, a data instance (denoted as $x_{unclassified}$) is extracted from flows associated with this unclassified client. Such data instance is referred to as a unclassified data instance to reflect its association with the unclassified client. In one or more embodiments, the unclassified data instance is in the same feature vector format as the data instances in the training data set. Each feature in the feature vector corresponds to a server and represents a measure of communication activity between the unclassified client and the server in these network flows. In one or more embodiments, the communication activity is measured based on a number of flows, packets, bytes, or other data units exchanged during the aforementioned training interval.

In Step 307, a classification label of the unclassified data instance is generated by applying the classification model to the unclassified data instance. In one or more embodiments, applying the classification model includes computing the class label (also referred to as classification label) for the unclassified data instance $x_{unclassified}$ as $f(x_{unclassified})$=sign $[w^T x_{unclassified} + b]$ where w and b are solved in Step 304 above.

In Step 308, if the classification label of the unclassified data instance is the malicious label, the unclassified client is classified as associated with a botnet (i.e., labeled as malicious).

Returning to the discussion of the Step 305, generally, the training data set used for spam or malware detection often evolves dynamically. For instance, in botnet detection, after a new machine gets infected, it may begin communicating with C&C servers, where no communication activity in traffic flows may have been observed before. Even if the features in the feature vector of the labeled data instance in the training data set remains the same, effects due to churn in the hosting infrastructure with new machines being infected and infected machines being cleaned up leads to changes in the importance of each feature. For instance, a newly infected machine may be elevated to the position of a C&C server and hence the feature weight learnt for this IP address should be modified accordingly. Similarly, an existing C&C server may be taken down either by law-enforcement or due to cleaning-up of that machine by anti-virus solutions, and hence the feature weight corresponding to that IP address should be adjusted accordingly.

Similarly, in email spamming, one of the common ways by which spammers try to evade anti-spam solutions is by changing the content keywords that they use in their e-mail templates. Moreover, malware and spam hosting infrastructures are well known to employ "fast-flux" at the domain or IP levels. For instance, spammers constantly modify the domain name where they are hosting their spamvertised content by coming up with a new domain name every day via a method known as "domain fast-flux" or by migrating their servers to new IP addresses via a method commonly referred to as "IP fast-flux". As a result, a supervised learning model trained on initial features may not be as effective when applied to the next day's network data because it would not be able to utilize the new features present in the next day's network data. To improve its detection rate without incurring significant computational overhead, the classification model must be updated incrementally to take these effects into account. An example is illustrated using FIG. 2 below.

As shown in FIG. 2, the training data set A (200) described above corresponds to a training time interval in $Day_1$ while the training data set B (220) corresponds to another training time interval in $Day_2$. As shown, the training data set B (220) includes information related to an additional labeled client $cip_3$ and each labeled data instance (i.e., feature vector) is expanded and includes five features corresponding to servers $sip_1$ through $sip_5$. In particular, the original labeled data instances (201) and (202) are expanded to the new labeled data instances (221) and (222). Further, the training data set B (220) includes an additional labeled data instance (223). Similar to the training data set A (200), these new labeled data instances (221), (222), and (223) are labeled with classification labels (221a), (222a), and (223a), respectively.

Dynamic feature adaptation refers to incrementally updating the classification model in the scenario that the training data instances are associated with the same clients from one training time interval to a subsequent training time interval, but elements in the feature vectors may grow with the addition of new features that have never been seen in the past. Furthermore, the class label of a training data instance may also change over time.

Said in other words, the training data set is expanded for the subsequent training time interval in dynamic feature adaptation by adding additional features, corresponding to additional servers contributing to the communication activities, to each feature vector of the malicious data instances and non-malicious data instances in the training data set. Each of the additional features in the feature vector represents the measure of communication activity between an additional server and one of the clients in the original training data set.

In dynamic feature adaptation, an expanded classification model for the subsequent training time interval is generated by (i) revising the unconstrained formulation of the SVM algorithm, (ii) determining an expanded maximum margin hyperplane based on a mathematical solution of the revised unconstrained formulation, (iii) expanding the unclassified data instance by adding an additional feature extracted from additional network traffic data exchanged between the unclassified client and the additional server, where the additional feature represents the measure of communication activity between the unclassified client and the additional server, and (iv) generating or revising the classification label of the expanded unclassified data instance by applying the expanded classification model to the expanded unclassified data instance. Accordingly, the unclassified client is classified or re-classified as associated with the botnet if the classification label is the malicious label.

Mathematically, let $x^t$ represent the training data set (e.g., training data set A (200) in FIG. 2) at time t (e.g., Day$_1$) and $x^{t+1} = x^t \cup \hat{x}^{(t+1)}$ represents the expanded training data set (e.g., a portion of the training data set B (200) consisting of labeled data instances (221) and (222) in FIG. 2) at time t+1 (e.g., Day$_2$). Specifically, $\hat{x}^{(t+1)}$ represents the newly added features (e.g., the features corresponding to IP pairs (cip$_1$, sip$_5$) and (cip$_2$, sip$_5$)) in the expanded portion of the expanded training data set. While the exact SVM solution based on the expanded training data set for generating a new classification model applies to an expanded feature vector space (e.g., with five dimensions corresponding to sip$_1$ through sip$_5$ in feature vectors (221) through (223) in FIG. 2) expanded from the original four dimensional feature vector space (e.g., with four dimensions corresponding to sip$_1$ through sip$_4$ in feature vectors (201) and (202) FIG. 2), an incremental SVM solution is applied to an incremental feature vector space having a cardinality equal to how many additional features are added to the original feature vectors. Specifically, the maximum margin hyperplane with the normal vector w remains the same in the original feature vector space while an incremental maximum margin hyperplane with the incremental normal vector v is solved as the incremental SVM solution. Said in other words, an updated hyperplane for the expanded training data set has higher cardinality due to additional dimensions corresponding to the added features and is generated as a weighted function of the original hyperplane in the original feature vector space and a newly learnt incremental hyperplane in the incremental feature vector space based on dimensions corresponding to only the added features.

In one or more embodiments of the invention, the LS-SVM objective function shown in equation (2) is incrementally modified to incrementally generate the solution for the new maximum margin hyperplane of the new classification model in dynamic feature adaptation (i.e., adapting to the expanded feature(s), such as the feature corresponding to sip$_5$) by (i) substituting the variable w with $\lambda$w in equation (2) to modify weights associated with each feature in the original feature vector uniformly while maintaining the cardinality of w and (ii) adding additional terms to represent incremental contributions from the expanded feature(s) (e.g., corresponding to sip$_5$). Specifically, the incrementally modified LS-SVM objective function is shown below:

$$\mathcal{L} = \frac{1}{2}[\lambda^2 w^T w + v^T v] + \gamma \frac{1}{2} \sum_{i=1}^{l} e_i^2 - \sum_{i=1}^{l} \alpha_i \{y_i[\lambda(w^T x_i + b) + v^T \hat{x}_i + \hat{b}] - 1 + e_i\} + c\lambda^2 \quad (3)$$

where the superscripts are omitted for clarity, $x_i$ represents the $i^{th}$ feature vector in the original training data set, $\hat{x}_i$ represents the feature vector in the expanded portion $\hat{x}$ of the expanded training data set, v and $\hat{b}$ represent the incremental normal vector and the incremental intercept, respectively, of the incremental maximum margin hyperplane, and a regularization term $c\lambda^2$ is included to constrain the magnitude of $\lambda$. As will be shown below, the parameter $\lambda$ is determined automatically, based on the degree of agreement between the previous classification model (i.e., based on the original feature vectors) and the current labels of the expanded data instances. The more agreement there is, the larger $\lambda$ will be. Furthermore, even if the uniformity assumption about the modification to w does not hold, any inaccuracies in the new model can be compensated by the weights learned from the new features in the expanded portion $\hat{X}$ of the expanded training data set. The experimental results shown in FIGS. 4A-4D below have suggested that the classification model built incrementally performs as well as the counterpart exact solution.

In one or more embodiments, once the incremental normal vector v and the incremental intercept $\hat{b}$ are solved, the classification label of a unclassified data instance $x_{unclassified} + \hat{x}_{unclassified}$ is computed as:

$f(x_{unclassified} + \hat{x}_{unclassified}) = \text{sign}[w^T x_{unclassified} + v^T \hat{x}_{unclassified} + b]$ where w and b are solved using equation (2) in Step 304 above.

In one or more embodiments, with w and b previsously solved, the incremental normal vector v and the incremental intercept $\hat{b}$ are solved by the following steps.

Optimizing the objective function L by taking the partial derivative of L over the model parameters v, $\hat{b}$, $\lambda$, e, and $\alpha$ and setting them to zeros yield the following:

$$\begin{bmatrix} I_d & 0 & 0 & 0 & -\hat{Z}^T \\ 0 & 0 & 0 & 0 & -y^T \\ 0 & 0 & 0 & \gamma I_N & -I_N \\ 0 & 0 & c+w^T w & 0 & -g^T \\ \hat{Z} & y & 0 & I_N & 0 \end{bmatrix} \begin{bmatrix} v \\ \hat{b} \\ \lambda \\ e \\ \alpha \end{bmatrix} = \begin{bmatrix} 0_d \\ 0 \\ 0_N \\ 0 \\ 1_N \end{bmatrix} \quad (4)$$

where $g = Zw + by = (Xw + b1_N) \odot y$ is an N-dimensional column vector that measures the agreement between the predicted values of the previous classification model and the current labels of the expanded data instances. The notation $\odot$ corresponds to element-wise vector product. After some simplification, the optimization problem reduces to solving the following system of linear equations:

$$\begin{bmatrix} 0 & y^T \\ y & \frac{gg^T}{c+w^Tw} + \hat{Z}\hat{Z}^T + \gamma^{-1} I_N \end{bmatrix} \begin{bmatrix} \hat{b} \\ \alpha \end{bmatrix} = \begin{bmatrix} 0 \\ 1 \end{bmatrix} \quad (5)$$

There are several advantages of using this formulation. First, instead of working with the N*d matrix x, it is sufficient to collapse the old features into a column vector g, thereby reducing the storage requirements. This is important because the number of original features d keeps growing over time in dynamic feature adaptation. Second, even if the feature values in x has changed in the new time period, only the corresponding elements in g need to be updated to reflect these changes. Finally, this formulation also allows the ground truth labels $y_i$ to vary over time as long as g is computed using the most recent labels.

Note that λ is determined automatically based on the consistency between the predictions made by the previous classification model and the current labels of the expanded data instances.

$$\lambda = \frac{\alpha^T g}{w^T w + c} = \frac{\alpha^T [(Xw + b1) \odot y]}{w^T w + c} \quad (6)$$

This formula suggests that the value for λ is large when the predictions made by the previous classification model are consistent with the current labels of the expanded data instances (especially for those instances associated with large values of α). On the other hand, if the previous model becomes outdated, then the value for λ will automatically be reduced.

Dynamic feature and data adaptation refers to the dynamic feature adaption described above with new training data instances incorporated during a subsequent training time interval to expand the original training data set. In one or more embodiments, the deployed system has bounded storage capacity to store at most N training data instances in memory at a time. Furthermore, since the complexity of the SVM algorithm is proportional to $N^2$, maintaining the growing number of training data instances would make the computation more expensive. To circumvent this problem, several approaches can be adopted that maintain the size of the training data set to remain as N when new training data instances are added. In particular, we focus on training instances that can either maintain or help improve the performance of the classifier.

In dynamic feature and data adaption, a new training data instances may be extracted that is associated with an additional malicious client or non-malicious client identified based on an updated version of the IP blacklist or whitelist, respectively. Such new training data instances is extracted during the subsequent training time interval and added to the incrementally revised training data set. IP-pairs of the original training data instances continue to be monitored to update features in the feature vectors based on ongoing communication activities. Accordingly, the features and class labels may evolve between the training data instances and the incrementally revised training data instances. In one or more embodiments, the classification model is revised based on the revised training data set and used to generate the classification label of the unclassified data instance subsequent to revising the classification model.

As described above, the size of the training data set is to remain the same when t new training data instances are added. In one or more embodiments, the training data set may be further revised by removing a candidate data instance from the training data set. The candidate data instance may be identified from the training data set based on (i) a timestamp of when the candidate data instance was added to the training data set or (ii) a pre-determined measure representing contribution from the candidate data instance to the classification model. For example, the contribution may be determined based on the corresponding a multiplier in the equations (2)-(6) above.

In one or more embodiments, a new labeled data instance (e.g., from an updated blacklist or whilelist) that has been misclassified by the existing classification model is included in the expanded training data set. Let $D=\{x_1, x_2, \ldots, x_N\}$ be the current training data set and $D_2=\{x_{N+1}, x_{N+2}, \ldots, x_{N+m}\}$ be the misclassified new data instances. In order to include the additional m new instances, the same number of labeled data instances need to be removed from the training data set D. Three instance removal strategies are considered. The first strategy OLD simply removes the oldest training data instances (i.e., labeled data instances in the training data set D) and replaces them with the misclassified new data instances. The second strategy MIN discards the m training data instances with smallest values for a. The rationale behind this approach is that such examples have the least influence on the decision surface of the classifier.

The third strategy is designed to identify labeled data instances in the training data set D whose removal has minimal effect on the current classification model. Let $f_q(x)=\Sigma_{x_i \in Q} y_i \alpha_i x_i \cdot x + b$ be the classification model constructed from a training set Q and $S^* \subset D$ be the set of training data instances selected for removal. The problem of selecting training instances to remove may be formalized as follows:

$$S^* = \underset{S}{argmin} E[|f_D(x) - f_{D \setminus S}(x)|] \quad (7)$$

$$= \underset{S}{argmin} E\left[\left|\sum_{x_i \in D} y_i \alpha_i x_i \cdot x - \sum_{x_i \in D \setminus S} y_i \alpha_i x_i \cdot x\right|\right]$$

$$= \underset{S}{argmin} E\left[\left|\sum_{x_i \in S} y_i \alpha_i x_i \cdot x\right|\right]$$

$$= \underset{S}{argmin} E\left[\left(\sum_{x_i \in S} y_i \alpha_i x_i\right) \cdot x\right],$$

where E[ . . . ] denote expected value. Solving the objective function shown above can be expensive especially when the training data set size is large. The MIN approach (strategy 2) tries to find an approximate solution by choosing $$S^* = \underset{S}{argmin} \left|\sum_{x_i \in S} \alpha_i\right|$$

The limitation of this approach is that it ignores the class label of the selected training data instances unlike the objective function given in Equation (7). Instead, the third strategy (GREEDY) is designed to select training data instances that minimize the following objective function:

$$S^* = \underset{S}{\arg\min} \left| \sum_{x_i \in S} y_i \alpha_i \right|$$

After S* is computed, a new training data set D*= (D/S*)∪D₂ is constructed. Finally, the online LS-SVM with dynamic feature adaptation approach described in the previous section is applied to the new training data set D*.

FIGS. 4A-4D depict an example in accordance with one or more embodiments of the invention. The example is based on the system and method described in FIGS. 1 and 3 above using two real-world data sets. The first data set is a benchmark malicious URL dataset, which contains data collected in 20 days, each of which has 20,000 unique URLs. The features include 1,791,261 lexical features and 1,117,901 host-based features. Nearly one third of the data belongs to the positive class (i.e., malicious URL). The second data set is a botnet detection data set collected by monitoring the HTTP network traffic at a large ISP in 24 hours. The data contains Layer-4 and Layer-7 load information, including source and target IPs, number of bytes sent and received, number of packets sent and received, etc. In this study, the objective is to identify whether a client computer is part of a botnet by inspecting what other IPs it has connected to. A bipartite graph that is formed of only the source and target IPs. Botnets are identified using techniques that include generating the network signature for each botnet C&C channel by studying their post-mortem analysis at several security web sites. The botnets discovered in the trace include Conficker, Grum, Pong, Pushdo and Sality.

For the URL data, half is used for training and the remainder used for testing. The test data is randomly split into five subsets. Each subset is further split into two further subsets of equal size, one as "labeled" (i.e., malicious or non-malicious) data to be used for updating the classification model and the other as "unlabeled" (i.e., unclassified) data. Similarly, for the botnet data, the data is split into four six-hour subsets, each containing all client IPs observed in a consecutive six-hour time window. A classifier is first trained on the first subset with the next subset (which is also split into labeled and unlabeled data) added incrementally in succession. The predicted classification labels based on the method described in reference to FIG. 3 above are compared to known labels contained in the real-world data sets to compute prediction error statistics shown in FIGS. 4A-4C. Statistics of training time (i.e., computation time to generate the classification models) is shown in FIG. 4D. Throughout FIGS. 4A-4D, the legend "Batch" refers to an exact SVM solution while the legend "DynF" refers to the dynamic feature adaptation solution.

Figure 4A:
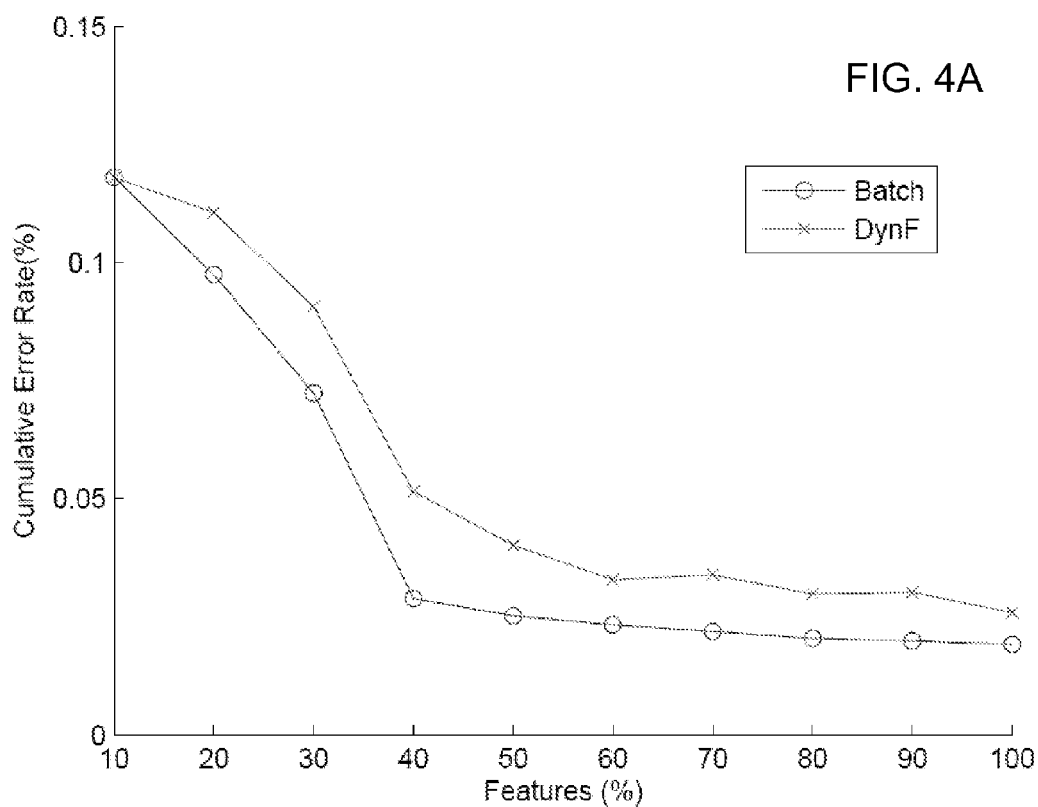
FIGS. 4A-4D show an example according to aspects of the invention.

FIG. 4A depicts classification error rate on Day 1 data plotted against percentage of total number of features incrementally added to the training data set and the classification model.

Figure 4B:
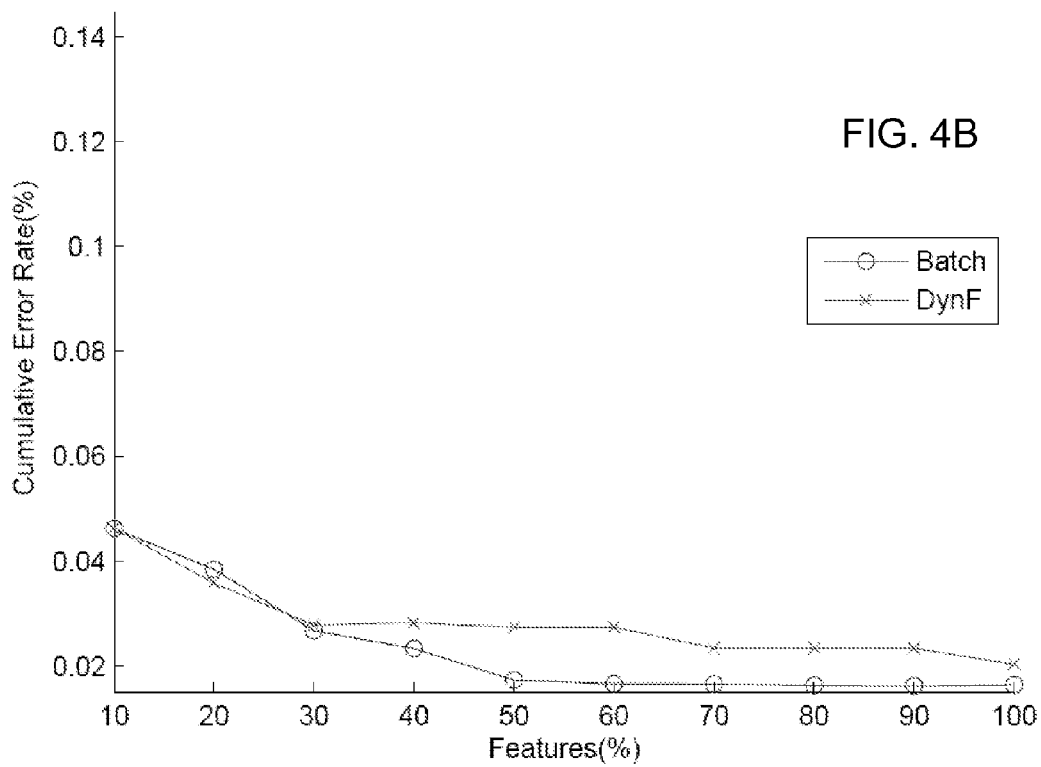

FIG. 4B depicts classification error rate on Day 2 data plotted against percentage of total number of features incrementally added to the training data set and the classification model.

Figure 4C:
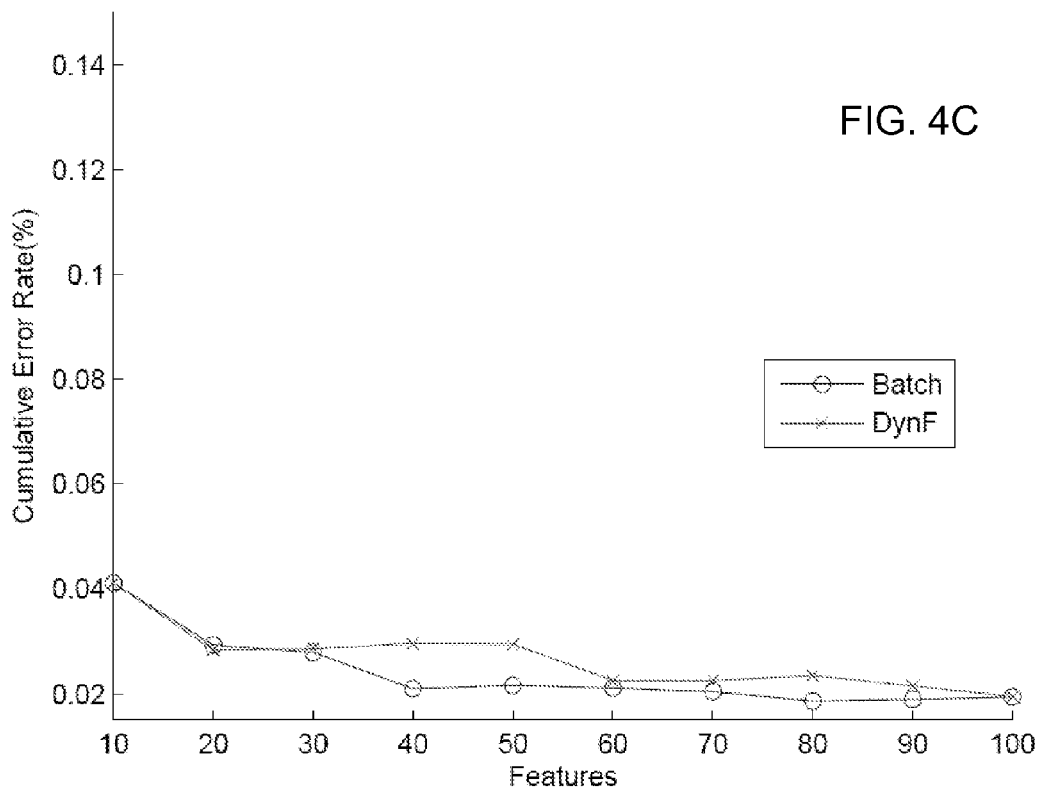
Figure 4D:
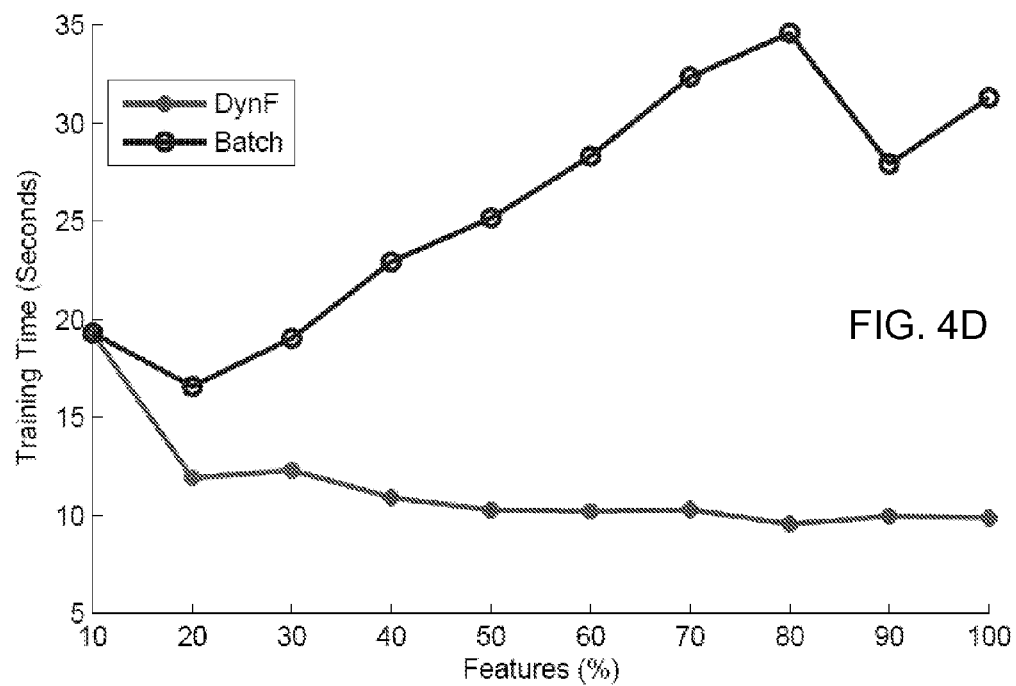

FIG. 4C depicts classification error rate on Day 3 data plotted against percentage of total number of features incrementally added to the training data set and the classification model.

FIG. 4D depicts classification model training time plotted against percentage of total number of features incrementally added to the training data set and the classification model.

Although specific formats, structures, or partitions are used as examples in the foregoing description regarding the various components in the malicious client classification tool, user system, and computer network, one skilled in the art, with the benefit of this disclosure, would recognize that other formats or structures may also be used in the system, methods, and examples described without deviating from the spirit of the invention.

Figure 5:
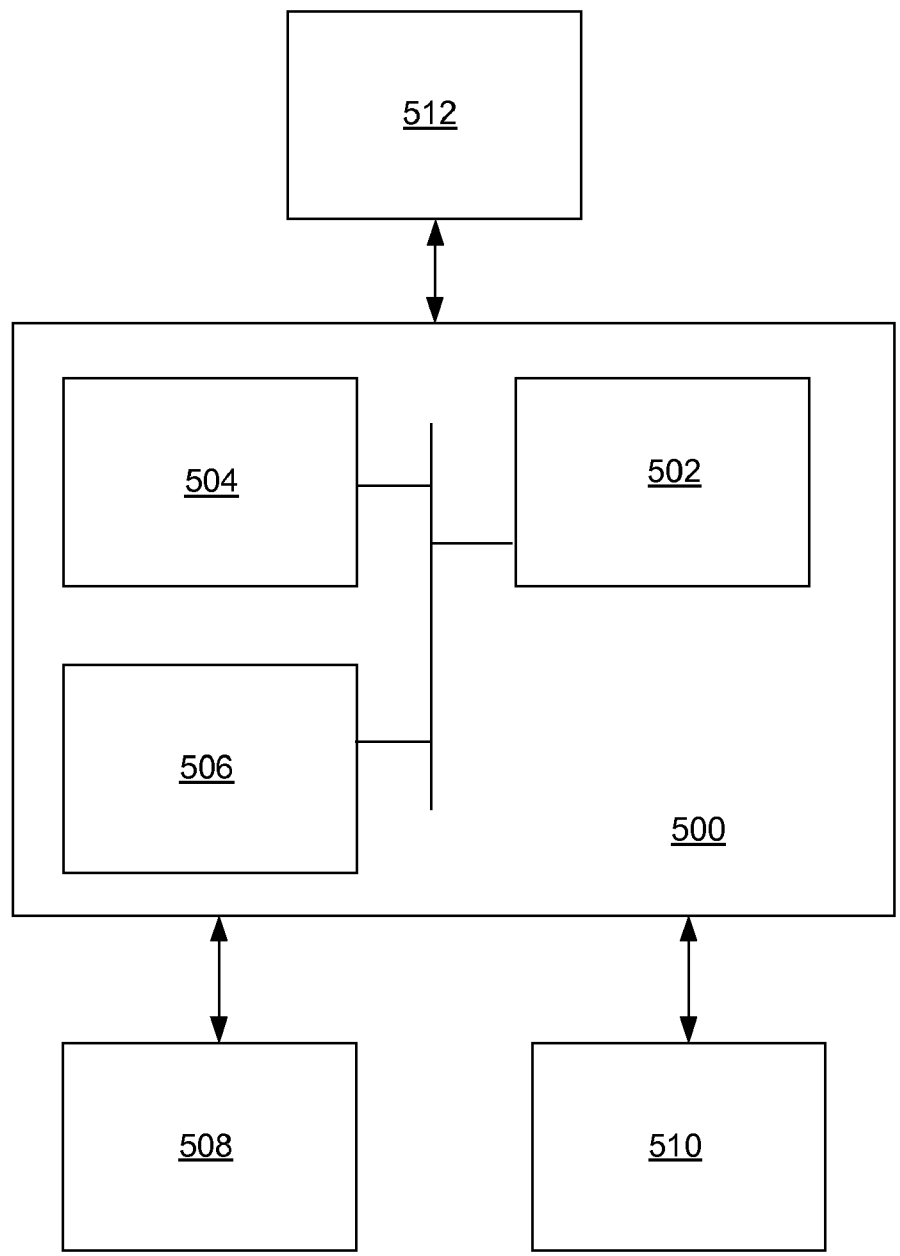
FIG. 5 shows a computer system according to aspects of the invention.

Embodiments of the invention may be implemented on virtually any type of computer regardless of the platform being used. For example, as shown in FIG. 5, a computer system (500) includes one or more processor(s) (502) (e.g., central processing unit or CPU), associated memory (504) (e.g., random document access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor) for example to display various results such as the feature vectors, the principal components, the application space, the signatures, etc. The computer system (500) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for botnet detection in a network, comprising:
    extracting, by a processor of a computer system and from first network traffic data exchanged between a malicious client and a plurality of servers in the network, a malicious data instance comprising a first plurality of features, corresponding to the plurality of servers, each representing a measure of communication activity between the malicious client and a first corresponding server in the first network traffic data;

extracting, by the processor and from second network traffic data exchanged between a non-malicious client and the plurality of servers, a non-malicious data instance comprising a second plurality of features, corresponding to the plurality of servers, each representing the measure of communication activity between the non-malicious client and a second corresponding server in the second network traffic data;

including the malicious data instance and the non-malicious data instance in a training data set comprising a plurality of malicious data instances and non-malicious data instances, wherein each data instance of the plurality of malicious data instances and non-malicious data instances is associated with one of a plurality of clients comprising the malicious client and the non-malicious client;

generating, by the processor and using a pre-determined machine learning algorithm, a classification model based on the training data set, wherein the classification model is adapted to, when applied to one or more malicious data instance, generate a malicious label, wherein the classification model is further adapted to, when applied to one or more non-malicious data instance, generate a non-malicious label;

extracting, by the processor and from third network traffic data exchanged between a unclassified client and the plurality of servers, a unclassified data instance comprising a third plurality of features, corresponding to the plurality of servers, each representing a measure of communication activity between the unclassified client and a third corresponding server in the third network traffic data;

generating, by the processor, a classification label of the unclassified data instance by applying the classification model to the unclassified data instance, wherein the classification label comprises the malicious label; and identifying, in response to the classification label comprising the malicious label, the unclassified client as associated with a botnet.

2. The method of claim 1, further comprising:
identifying each of the plurality of clients as one of malicious and non-malicious based on a pre-determined list,
wherein a first data instance of the plurality of malicious data instances and non-malicious data instances is identified as malicious in response to identifying a first client associated with the first data instance as malicious based on the pre-determined list, and
wherein a second data instance of the plurality of malicious data instances and non-malicious data instances is identified as non-malicious in response to identifying a second client associated with the second data instance as non-malicious based on the pre-determined list.

3. The method of claim 1, wherein the measure of communication activity comprises at least one selected from a group consisting of a number of flows exchanged during a pre-determined length of time, a number of packets exchanged during the pre-determined length of time, and a number of bytes exchanged during the pre-determined length of time.

4. The method of claim 1,
wherein the pre-determined machine learning algorithm comprises a support vector machine (SVM) algorithm, and
wherein the classification model comprises a decision surface of the SVM.

5. The method of claim 4,
wherein the decision surface comprises a maximum margin hyperplane in a multi-dimensional space having a plurality of axes corresponding to the plurality of servers, each of the plurality of axes having coordinates representing the measure of communication activity between a fourth corresponding server and any of the plurality of clients,
wherein generating the classification model comprises:
representing each data instance of the plurality of malicious data instances and non-malicious data instances by a node in the multi-dimensional space;
formulating a constrained optimization criterion of the SVM algorithm based on the training data set, wherein variables in the constrained optimization criterion comprise a normal vector w of the maximum margin hyperplane and an intercept b of the maximum margin hyperplane;
converting the constrained optimization criterion to a unconstrained formulation using a pre-determined mathematical procedure;
determining the maximum margin hyerplane based on a first mathematical solution of the unconstrained formulation for solving w and b,
wherein the maximum margin hyerplane segregates a first plurality of nodes corresponding to a plurality of malicious data instances and a second plurality of nodes corresponding to a plurality of non-malicious data instances, and
wherein applying the classification model comprises:
computing a function $f(x_{unclassified}) = \text{sign}[w^T x_{unclassified} + b]$ based on the first mathematical solution for w and b, where $x_{unclassified}$ represents, in a vector format, the third plurality of features of the unclassified data instance and T represents a transpose operator, and
determining the classification label based on a value of the function f(x).

6. The method of claim 5, wherein the unconstrained formulation comprises a first term represented by $w^T w$ and a second term represented by $\alpha_i y_i [w^T x_i + b]$, where $\alpha_i$ represents an $i^{th}$ multiplier included in a summation operation in the unconstrained formulation and associated with an $i^{th}$ data instance of the plurality of malicious data instances and non-malicious data instances in the training data set, $y_i$ represents an $i^{th}$ classification label included in the summation operation and associated with the $i^{th}$ data instance, and $x_i$ represents, in the vector format, an $i^{th}$ plurality of features of the $i_{th}$ data instance in the summation operation, wherein the summation operation is performed over $1 < i < N$ where N represents a number of data instances in the training data set.

7. The method of claim 6, further comprising:
expanding the training data set based on a plurality of additional servers in the network in addition to the plurality of servers by adding a plurality of additional features, corresponding to the plurality of additional servers, to each of the plurality of malicious data instances and non-malicious data instances, each of the plurality of additional features representing the measure of communication activity between an additional server and one of the plurality of clients, wherein adding the plurality of additional features comprises:
adding a first additional feature to expand the malicious data instance, wherein the first additional feature is extracted from first additional network traffic data exchanged between the malicious client and the additional server, the first additional feature representing the measure of communication activity between the malicious client and the additional server; and adding a second additional feature to expand the non-malicious data instance, wherein the second additional feature is extracted from second additional network traffic data exchanged between the non-malicious client and the additional server, the second additional feature representing the measure of communication activity between the non-malicious client and the additional server;

generating an expanded classification model by at least:

revising the unconstrained formulation of the SVM algorithm to generate a revised unconstrained formulation by at least substituting the first term with $\lambda^2 w^T w + v^T v$ and substituting the second term with $\alpha_i y_i [\lambda(w^T x_i + b) + v^T \hat{x}_i + \hat{b}]$, where $\lambda$ represents a level of consistency between the classification model and the expanded training data set, v and $\hat{b}$ represent a normal vector and an intercept, respectively, of another maximum margin hyerplane in another multi-dimensional space having another plurality of axes corresponding to the plurality of additional servers, each of the another plurality of axes having coordinates representing the measure of communication activity associated with a corresponding additional server, and $\hat{x}_i$ represents, in the vector format, an ith plurality of additional features added to the $i^{th}$ data instance in the summation operation, wherein the summation operation;

determining the another maximum margin hyerplane based on a second mathematical solution of the revised unconstrained formulation for solving v and $\hat{b}$, wherein v and $\hat{b}$ are solved by at least substituting the first mathematical solution for w and b into the revised unconstrained formulation;

expanding the unclassified data instance by at least adding a third additional feature extracted from third additional network traffic data exchanged between the unclassified client and the additional server, the third additional feature representing the measure of communication activity between the unclassified client and the additional server;

generating another classification label of the expanded unclassified data instance by applying the expanded classification model to the expanded unclassified data instance, wherein the another classification label comprises the malicious label; and further identifying, in response to the another classification label comprising the malicious label, the unclassified client as associated with the botnet.

8. The method of claim 1, further comprising:
revising the training data set at least by:
identify a candidate data instance from the plurality of malicious data instances and non-malicious data instances in the training data set based on a pre-determined criterion; and
removing the candidate data instance from the training data set;
revising the classification model based on the revised training data set,
wherein the classification label of the unclassified data instance is generated subsequent to revising the classification model.

9. The method of claim 8, wherein the candidate data instance is identified from the training data set based on a timestamp of when the candidate data instance was added to the training data set.

10. The method of claim 8, wherein the candidate data instance is identified from the training data set based on a pre-determined measure representing contribution from the candidate data instance to the classification model.

11. The method of claim 6, further comprising:
revising the training data set at least by:
identify a candidate data instance based on a pre-determined measure representing contribution from the candidate data instance to the classification model, wherein the candidate data instance is represented as the $i^{th}$ data instance of the plurality of malicious data instances and non-malicious data instances in the training data set, wherein the contribution is determined based on the $i^{th}$ multiplier $\alpha_i$ included in the summation operation and associated with the candidate data instance; and
removing the candidate data instance from the training data set;
revising the classification model based on the revised training data set,
wherein the classification label of the unclassified data instance is generated subsequent to revising the classification model.

12. The method of claim 2, further comprising:
extracting, from fourth network traffic data exchanged between another malicious client and the plurality of servers, another malicious data instance comprising a fourth plurality of features, corresponding to the plurality of servers, each representing a measure of communication activity between the another malicious client and a fourth corresponding server in the fourth network traffic data, wherein the classification model, when applied to the another malicious data instance, generate the non-malicious label;
revising the training data set at least by including the another malicious data instance in the training data set; and
revising the classification model based on the revised training data set,
wherein the classification label of the unclassified data instance is generated subsequent to revising the classification model.

13. The method of claim 12, further comprising:
identifying the another malicious client based on an updated version of the pre-determined list.

14. A system for botnet detection in a network, comprising:
a hardware processor;
a feature extractor executing on the hardware processor and configured to:
extract, from first network traffic data exchanged between a malicious client and a plurality of servers in the network, a malicious data instance comprising a first plurality of features, corresponding to the plurality of servers, each representing a measure of communication activity between the malicious client and a first corresponding server in the first network traffic data;
extract, from second network traffic data exchanged between a non-malicious client and the plurality of servers, a non-malicious data instance comprising a second plurality of features, corresponding to the plurality of servers, each representing the measure of communication activity between the non-malicious client and a second corresponding server in the second network traffic data;
include the malicious data instance and the non-malicious data instance in a training data set comprising a plurality of malicious data instances and non-malicious data instances, wherein each data instance of the plurality of malicious data instances and non-malicious data instances is associated with one of a plurality of clients comprising the malicious client and the non-malicious client; and extract, from third network traffic data exchanged between a unclassified client and the plurality of servers, a unclassified data instance comprising a third plurality of features, corresponding to the plurality of servers, each representing the measure of communication activity between the unclassified client and a third corresponding server in the third network traffic data;

a model generator operatively coupled to the feature extractor, executing on the hardware processor, and configured to:

generate, using a pre-determined machine learning algorithm, a classification model based on the training data set, wherein the classification model is adapted to, when applied to one or more malicious data instance, generate a malicious label, wherein the classification model is further adapted to, when applied to one or more non-malicious data instance, generate a non-malicious label;

an online classifier operatively coupled to the model generator, executing on the hardware processor, and configured to:

generate a classification label of the unclassified data instance by applying the classification model to the unclassified data instance, wherein the classification label comprises the malicious label; and identify, in response to the classification label comprising the malicious label, the unclassified client as associated with a botnet; and a repository coupled to the online classifier and configured to store the plurality of malicious data instances and non-malicious data instances, the unclassified data instance, and the classification model.

15. The system of claim 14, further comprising an acquisition module configured to:

identify each of the plurality of clients as one of malicious and non-malicious based on a pre-determined list; and obtain the first, second, and third network traffic data from the network, wherein a first data instance of the plurality of malicious data instances and non-malicious data instances is identified as malicious in response to identifying a first client associated with the first data instance as malicious based on the pre-determined list, and wherein a second data instance of the plurality of malicious data instances and non-malicious data instances is identified as non-malicious in response to identifying a second client associated with the second data instance as non-malicious based on the pre-determined list.

16. The system of claim 14, wherein the measure of communication activity comprises at least one selected from a group consisting of a number of flows exchanged during a pre-determined length of time, a number of packets exchanged during the pre-determined length of time, and a number of bytes exchanged during the pre-determined length of time.

17. The system of claim 1, wherein the pre-determined machine learning algorithm comprises a support vector machine (SVM) algorithm, and wherein the classification model comprises a decision surface of the SVM.

18. The system of claim 17, wherein the decision surface comprises a maximum margin hyerplane in a multi-dimensional space having a plurality of axes corresponding to the plurality of servers, each of the plurality of axes having coordinates representing the measure of communication activity between a fourth corresponding server and any of the plurality of clients, wherein generating the classification model comprises:

representing each data instance of the plurality of malicious data instances and non-malicious data instances by a node in the multi-dimensional space;

formulating a constrained optimization criterion of the SVM algorithm based on the training data set, wherein variables in the constrained optimization criterion comprise a normal vector w of the maximum margin hyerplane and an intercept b of the maximum margin hyerplane;

converting the constrained optimization criterion to a unconstrained formulation using a pre-determined mathematical procedure;

determining the maximum margin hyerplane based on a first mathematical solution of the unconstrained formulation for solving w and b, wherein the maximum margin hyerplane segregates a first plurality of nodes corresponding to a plurality of malicious data instances and a second plurality of nodes corresponding to a plurality of non-malicious data instances, and wherein applying the classification model comprises:

computing a function $f(x_{unclassified})=sign[w^T x_{unclassified}+b]$ based on the first mathematical solution for w and b, where $x_{unclassified}$ represents, in a vector format, the third plurality of features of the unclassified data instance and T represents a transpose operator, and determining the classification label based on a value of the function $f(x)$.

19. The system of claim 18, wherein the unconstrained formulation comprises a first term represented by $w^T w$ and a second term represented by $\alpha_i y_i [w^T x_i + b]$, where $\alpha_i$ represents an $i^{th}$ multiplier included in a summation operation in the unconstrained formulation and associated with an $i^{th}$ data instance of the plurality of malicious data instances and non-malicious data instances in the training data set, $y_i$ represents an $i^{th}$ classification label included in the summation operation and associated with the $i^{th}$ data instance, and $x_i$ represents, in the vector format, an $i^{th}$ plurality of features of the $i_{th}$ data instance in the summation operation, wherein the summation operation is performed over $1<i<N$ where N represents a number of data instances in the training data set.

20. The system of claim 19, wherein the feature extractor is further configured to:

expand the training data set based on a plurality of additional servers in the network in addition to the plurality of servers by adding a plurality of additional features, corresponding to the plurality of additional servers, to each of the plurality of malicious data instances and non-malicious data instances, each of the plurality of additional features representing the measure of communication activity between an additional server and one of the plurality of clients, wherein adding the plurality of additional features comprises:

adding a first additional feature to expand the malicious data instance, wherein the first additional feature is extracted from first additional network traffic data exchanged between the malicious client and the additional server, the first additional feature representing the measure of communication activity between the malicious client and the additional server; and adding a second additional feature to expand the non-malicious data instance, wherein the second additional feature is extracted from second additional network traffic data exchanged between the non-malicious client and the additional server, the second additional feature representing the measure of communication activity between the non-malicious client and the additional server; and expand the unclassified data instance by at least adding a third additional feature extracted from third additional network traffic data exchanged between the unclassified client and the additional server, the third additional feature representing the measure of communication activity between the unclassified client and the additional server, wherein the model generator is further configured to generate an expanded classification model by at least:

revising the unconstrained formulation of the SVM algorithm to generate a revised unconstrained formulation by at least substituting the first term with $\lambda^2 w^T w + v^T v$ and substituting the second term with $\alpha_i y_i [\lambda(w^T x_i + b) + v^T \hat{x}_i + b$, where $\lambda$ represents a level of consistency between the classification model and the expanded training data set, $v$ and $\hat{b}$ represent a normal vector and an intercept, respectively, of another maximum margin hyerplane in another multi-dimensional space having another plurality of axes corresponding to the plurality of additional servers, each of the another plurality of axes having coordinates representing the measure of communication activity associated with a corresponding additional server, and $\hat{x}_i$ represents, in the vector format, an ith plurality of additional features added to the $i^{th}$ data instance in the summation operation, wherein the summation operation; and determining the another maximum margin hyerplane based on a second mathematical solution of the revised unconstrained formulation for solving $v$ and $\hat{b}$, wherein $v$ and $\hat{x}$ are solved by at least substituting the first mathematical solution for $w$ and $b$ into the revised unconstrained formulation;

wherein the online classifier is further configured to:
generate another classification label of the expanded unclassified data instance by applying the expanded classification model to the expanded unclassified data instance, wherein the another classification label comprises the malicious label; and
further identify, in response to the another classification label comprising the malicious label, the unclassified client as associated with the botnet.

21. The system of claim 14, wherein the feature extractor is further configured to:
revise the training data set at least by:
identify a candidate data instance from the plurality of malicious data instances and non-malicious data instances in the training data set based on a pre-determined criterion; and
removing the candidate data instance from the training data set;
revise the classification model based on the revised training data set,
wherein the classification label of the unclassified data instance is generated subsequent to revising the classification model.

22. The system of claim 21, wherein the candidate data instance is identified from the training data set based on a timestamp of when the candidate data instance was added to the training data set.

23. The system of claim 21, wherein the candidate data instance is identified from the training data set based on a pre-determined measure representing contribution from the candidate data instance to the classification model.

24. The system of claim 19, wherein the feature extractor is further configured to:
revise the training data set at least by:
identify a candidate data instance based on a pre-determined measure representing contribution from the candidate data instance to the classification model, wherein the candidate data instance is represented as the $i^{th}$ data instance of the plurality of malicious data instances and non-malicious data instances in the training data set, wherein the contribution is determined based on the $i^{th}$ multiplier $\alpha_i$ included in the summation operation and associated with the candidate data instance; and
removing the candidate data instance from the training data set;
revise the classification model based on the revised training data set,
wherein the classification label of the unclassified data instance is generated subsequent to revising the classification model.

25. The system of claim 15, wherein the feature extractor is further configured to:
extract, from fourth network traffic data exchanged between another malicious client and the plurality of servers, another malicious data instance comprising a fourth plurality of features, corresponding to the plurality of servers, each representing a measure of communication activity between the another malicious client and a fourth corresponding server in the fourth network traffic data, wherein the classification model, when applied to the another malicious data instance, generate the non-malicious label;
revise the training data set at least by including the another malicious data instance in the training data set; and
revise the classification model based on the revised training data set,
wherein the classification label of the unclassified data instance is generated subsequent to revising the classification model.

26. The system of claim 25, wherein the acquisition module is further configured to:
identify the another malicious client based on an updated version of the pre-determined list.

27. A non-transitory computer readable medium storing instructions for identifying a botnet in a network, the instructions, when executed by
a processor of a computer, comprising functionality for:
extracting, from first network traffic data exchanged between a malicious client and a plurality of servers in the network, a malicious data instance comprising a first plurality of features, corresponding to the plurality of servers, each representing a measure of communication activity between the malicious client and a first corresponding server in the first network traffic data;
extracting, from second network traffic data exchanged between a non-malicious client and the plurality of servers, a non-malicious data instance comprising a second plurality of features, corresponding to the plurality of servers, each representing the measure of communication activity between the non-malicious client and a second corresponding server in the second network traffic data;

including the malicious data instance and the non-malicious data instance in a training data set comprising a plurality of malicious data instances and non-malicious data instances, wherein each data instance of the plurality of malicious data instances and non-malicious data instances is associated with one of a plurality of clients comprising the malicious client and the non-malicious client;

generating, using a pre-determined machine learning algorithm, a classification model based on the training data set, wherein the classification model is adapted to, when applied to one or more malicious data instance, generate a malicious label, wherein the classification model is further adapted to, when applied to one or more non-malicious data instance, generate a non-malicious label;

extracting, from third network traffic data exchanged between a unclassified client and the plurality of servers, a unclassified data instance comprising a third plurality of features, corresponding to the plurality of servers, each representing a measure of communication activity between the unclassified client and a third corresponding server in the third network traffic data;

generating a classification label of the unclassified data instance by applying the classification model to the unclassified data instance, wherein the classification label comprises the malicious label; and identifying, in response to the classification label comprising the malicious label, the unclassified client as associated with a botnet.

* * * * *